United States Patent [19]

Blaushild et al.

[11] Patent Number: 4,657,730

[45] Date of Patent: Apr. 14, 1987

[54] LOW STRESSED RATIONALLY SHAPED CORE SUPPORT

[75] Inventors: Ronald M. Blaushild, Pittsburgh; Luciano Veronesi, O'Hara Twp., Allegheny County, both of Pa.

[73] Assignee: Westinghouse Electric Corp., Pittsburgh, Pa.

[21] Appl. No.: 547,294

[22] Filed: Oct. 28, 1983

[51] Int. Cl.$^4$ .................. G21C 9/00; G21C 13/00
[52] U.S. Cl. ........................ 376/285; 376/461; 248/225.1
[58] Field of Search ........... 248/DIG. 1, 224.4, 225.1; 376/461, 463, 285

[56] References Cited

U.S. PATENT DOCUMENTS

| | | |
|---|---|---|
| 2,955,689 | 10/1960 | Hicks . |
| 3,070,533 | 12/1962 | Arms et al. . |
| 3,130,130 | 4/1964 | Haines et al. . |
| 3,425,906 | 2/1969 | Weber .............................. 376/461 X |
| 3,554,868 | 1/1971 | Thorp, II . |
| 3,937,653 | 2/1976 | Leheu . |
| 3,939,038 | 2/1976 | Pernstich . |
| 3,992,256 | 11/1976 | Lleres et al. . |

Primary Examiner—Deborah L. Kyle
Assistant Examiner—John S. Maples
Attorney, Agent, or Firm—Daniel C. Abeles

[57] ABSTRACT

The lower end of a nuclear reactor core barrel (16) is laterally stabilized within the reactor pressure vessel (10) by four auxiliary support structures (100) equiangularly disposed about the periphery of the reactor lower hemispherical shell (12). The core barrel lower support plate (18) has keys (122) secured thereto for disposition within recesses (114) defined within crossbeams (102) of the structures (100) through which horizontal radial and tangential forces, as well as severe vertical loads, are transmitted from the core barrel (16) to the reactor vessel (10). Shock absorbers (120) interconnect the keys (122) and the crossbeams (102), and divergent brackets (104) serve to radially space the crossbeam (102) from the shell wall (12) so as to define a vertical coolant flow channel (108) through each structure (100). The divergent brackets (104) serve to distribute radial loads from the core barrel (16) to the pressure vessel (10) as radial compression forces, and to convert tangential bending moments into circumferential shear and radial compression forces. Upper inclined portions (162) of the brackets (104) serve to vertically centralize the center of load (160) of horizontal tangential forces relative to the brackets' centers of gravity (152) so as to eliminate vertical bending moments, and inclined lower portions (139) of the brackets (104) serve to convert vertical bending loads into circumferential shear and radial compression forces.

13 Claims, 6 Drawing Figures

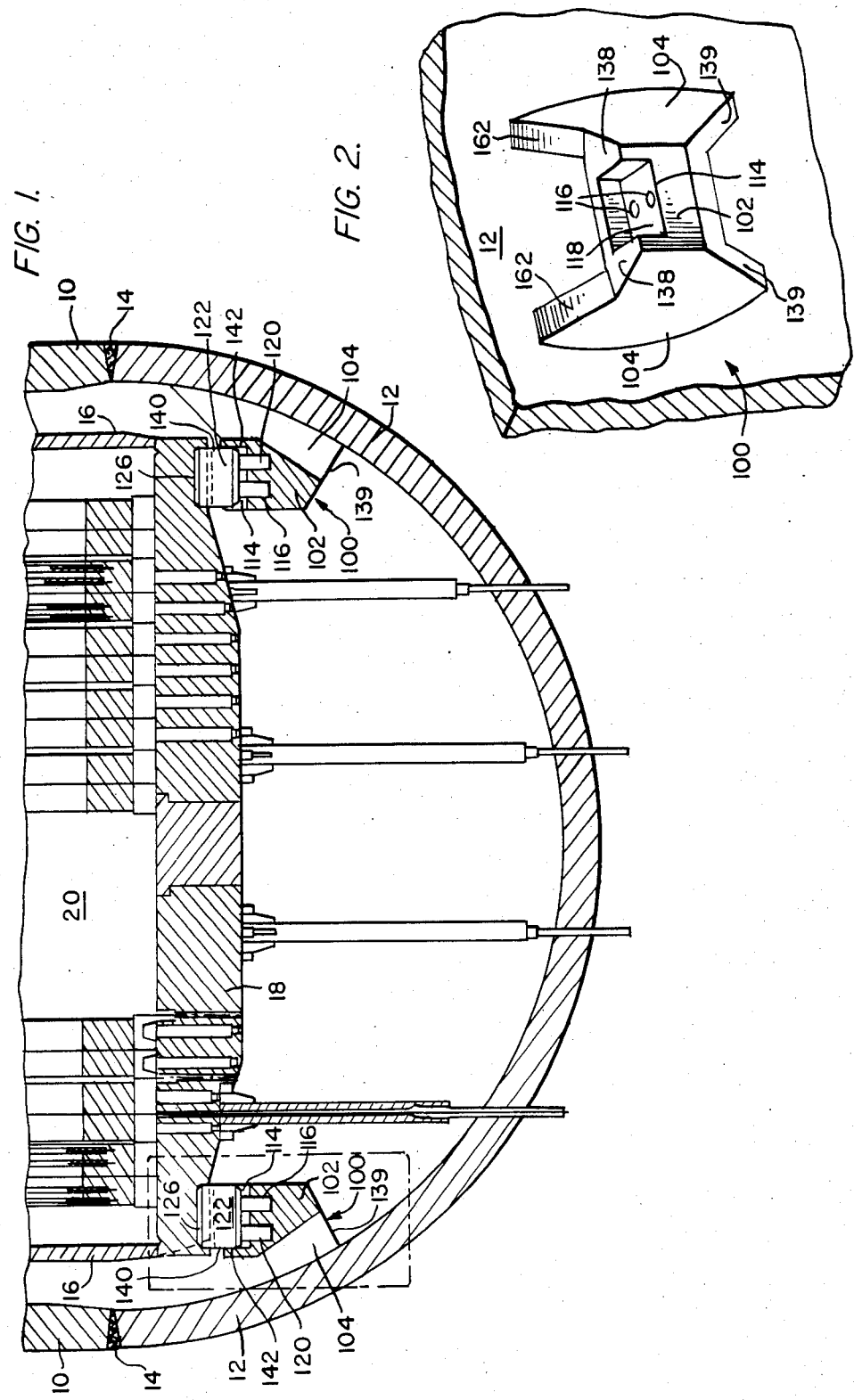

LOW STRESSED RATIONALLY SHAPED CORE SUPPORT

BACKGROUND OF THE INVENTION

1. Field of the Invention

The present invention relates generally to nuclear reactors, and more particularly to auxiliary support structures disposed within the lower portion of the reactor vessel for normally constraining the lower end of the core barrel in multiple-lateral directions within a horizontal plane, and for supporting the lower end of the core barrel in such a manner as to safely accommodate extraordinary vertical, radial, and/or tangential forces or loads which may be impressed upon the core barrel as a result, for example, of a natural occurrence originating outside of the reactor, or an operational or mechanical malfunction originating within the reactor, as well as for facilitating the relatively unimpeded flow of coolant throughout the lower end of the reactor vessel.

2. Description of the Prior Art

As is well known, a nuclear reactor conventionally comprises a substantially cylindrical, vertically oriented tubular reactor or pressure vessel, with the bottom of the vessel being in the form of a hollow hemispherical shell. A core vessel or barrel is disposed within the reactor or pressure vessel at an elevational level such that the bottom support plate of the core vessel or barrel is located a substantial distance above the bottom hemispherical shell wall of the reactor or pressure vessel. The reactor control rod guide tubes are of course located within the upper region of the core vessel or barrel, while the reactor core internals, comprising, for example, the fuel element assemblies, the fuel element assemblies support grid structure or framework, and the like, are of course housed within the lower region of the core vessel or barrel. Consequently, it can readily be appreciated that the core vessel or barrel embodies a considerable amount of weight.

It is therefore imperative that the core vessel or barrel be prevented from falling downwardly a substantial distance relative to the reactor or pressure vessel under, for example, seismic load or earthquake shock conditions, whereby the core vessel or barrel would tend to impact against the hemispherical bottom shell wall of the reactor or pressure vessel. Such an impact shock against the reactor or pressure vessel bottom shell wall would undoubtedly result in considerable structural damage to the reactor or pressure vessel, including the very real possibility of rupturing the reactor or pressure vessel bottom shell wall with the consequent release or leakage of the reactor core coolant out of the reactor or pressure vessel. In addition, this change in the elevational level of the core vessel or barrel relative to that of the reactor or pressure vessel would also present other safety hazards. In particular, for example, this drastic alteration in the relative disposition of the core fuel assemblies with respect to the reactor control rods would deleteriously affect the control functions of the control rods relative to the reactor core, and still further, the coolant flow throughout the reactor vessel would likewise be drastically altered.

Conventionally, therefore, the upper end of the core vessel or barrel is provided with an annular, radially outwardly extending flange, and an upper region of the reactor or pressure vessel is similarly provided with an annular, radially inwardly projecting shoulder or ledge upon which the core barrel flange may be seated. This structural system defined between the core vessel or barrel and the reactor or pressure vessel therefore constitutes the primary support means for suspendingly supporting the core vessel or barrel within the reactor or pressure vessel, however, this support system alone only serves to suspend the core vessel or barrel within the reactor or pressure vessel in a downwardly extending, cantilevered manner. If not otherwise supported, then the lower end of the core vessel or barrel will be laterally unstable within multiple lateral directions within a horizontal plane. Consequently, a further conventional practice embodied within the structural systems of nuclear reactors has been to substantially fix or support the lower end of the core vessel or barrel within the reactor or pressure vessel so as to impart lateral stability thereto. In addition, such auxiliary support means employed in connection with the lower end of the core vessel or barrel also serves as a secondary support system with respect to the aforenoted vertical loads which may be impressed upon the core vessel or barrel as a result, for example, of earthquake shock or seismic vibrational forces, core barrel of weld fractures, and the like.

One conventional type of auxiliary support system for the lower end of the reactor core barrel or vessel is disclosed within U.S. Pat. No. 3,554,868 issued to A. G. Thorp II on Jan. 12, 1971 and assigned to Westinghouse Electric Corporation, the assignee of the present application. Within this disclosed system, the central undersurface portion of the core barrel bottom support plate is supported upon the support structure which is welded to the lower central portion of the reactor or pressure vessel hemispherical shell wall. Consequently, it is apparent that while such a structural system may, in fact, suitably accomplish its lateral stability and requisite vertical load accommodation functions, it is seen that vertical static loads, as well as any vertical dynamic impact forces, will be transmitted in a substantially concentrated manner over a relatively small, localized area of the hemispherical bottom shell wall of the reactor or pressure vessel. Such load concentrations will be likely to develop high localized stressing within the central bottom portion of the reactor or pressure vessel shell wall, with the very real possibility of rupture of the same.

Another type of conventional auxiliary support system for the lower end of the reactor core barrel or vessel is of the type in which the reactor core barrel or vessel is supported by means of both a lower, central, shock-absorbing column, as well as circumferentially spaced, vertically disposed plates connected to the central, shock-absorbing column by means of upper and lower, radially extending, sets of strut members. While such a conventional support system therefore appears to resolve critical vertical load accommodation problems, resulting, for example, from seismic or earthquake vibrations or shocks, or any other similar, naturally occurring phenomenon, or mechanical or operational malfunction which would entail the imposition of extraordinary vertical load forces upon the core barrel or vessel, this system would appear to be deficient in accommodating non-radial, tangential loads impressed upon the core barrel or vessel. These loads tend to develop torque moments with respect to the circumferentially arranged core barrel support plates, and such moments generate bending and twisting stresses within such support plates and the side wall portions of the reactor or pressure vessel to which the support plates are secured.

It is to be noted further in conjunction with the last-mentioned type of conventional auxiliary support system that a solid, central, shock-absorbing support column which is disposed within the lowermost region of the reactor or pressure vessel will tend to obstruct the requisite circulation or flow of the core coolant throughout the reactor core internals and within the lowermost portion of the reactor or pressure vessel. In addition, it is also well known that as a result of the normal operation of a nuclear reactor, debris tends to be discharged into the reactor or pressure vessel, and particularly, within the core coolant. Naturally, such debris tends to accumulate within the lowermost portion of the reactor or pressure vessel under the action of gravitational forces. The various structural components of the reactor, including, for example, the shock absorber structures, are also known to be subjected to thermal expansion and contraction cycles. As often happens, the aforenoted reactor debris tends to collect within, or obstruct or clog, the various structural components of the reactor, and consequently, proper normal operation of such components, or proper operation of such components under emergency conditions, such as, for example, the shock absorber structures, is considerably hampered.

Accordingly, it is an object of the present invention to provide a new and improved auxiliary support structure for the core vessel or barrel of a nuclear reactor.

Another object of the present invention is to provide a new and improved auxiliary support structure for the core vessel or barrel of a nuclear reactor which will overcome the various aforenoted disadvantages of prior art conventional auxiliary support structures for the core vessel or barrel of a nuclear reactor.

Still another object of the present invention is to provide a new and improved auxiliary support structure for the core vessel or barrel of a nuclear reactor which will adequately provide lateral stabilization of the core vessel or barrel in multiple lateral directions within a horizontal plane under normal operating conditions of the nuclear reactor facility.

Yet another object of the present invention is to provide a new and improved auxiliary support structure for the core vessel or barrel of a nuclear reactor which will adequately provide lateral stabilization of the core vessel or barrel in multiple lateral directions within a horizontal plane, as well as vertical load accommodation, under exterior seismic or earthquake shock load conditions, or under interior operational or mechanical malfunction conditions.

Still yet another object of the present invention is to provide a new and improved auxiliary support structure for the core vessel or barrel of a nuclear reactor which will provide vertical shock absorbing capabilities for the core vessel or barrel and the reactor or pressure vessel under severe vertical dynamic load conditions.

Yet still another object of the present invention is to provide a new and improved auxiliary support structure for the core vessel or barrel of a nuclear reactor which will permit the substantial unobstructed circulation flow of coolant throughout the reactor internals, and particularly within the lower region of the reactor or pressure vessel.

A further object of the present invention is to provide a plurality of new and improved auxiliary support structures equiangularly located about the inner periphery of the reactor or pressure vessel for supporting the core vessel or barrel within the reactor or pressure vessel in such a manner that all loads impressed upon the core vessel or barrel, and transmitted to the auxiliary support structures, are optimally distributed to the sidewalls of the reactor or pressure vessel, and not exclusively concentrated over a relatively small, single, localized wall portion of the reactor or pressure vessel.

A still further object of the present invention is to provide a new and improved auxiliary support structure for the core vessel or barrel of a nuclear reactor which can provide vertical shock-absorbing capabilities to the core vessel or barrel and adequately support the same under severe dynamic vertical loading so as to prevent dynamic impact forces from being transmitted to the reactor or pressure vessel, and thereby preventing rupture of the reactor or pressure vessel.

A yet further object of the present invention is to provide a new and improved auxiliary support structure for the core vessel or barrel of a nuclear reactor which can adequately limit the vertical drop of the core vessel or barrel under severe vertical load conditions so as to maintain substantially the same elevational level of the core vessel or barrel for safe interaction of the core fuel assemblies with the reactor control rods, as well as with the circulating flow of coolant.

An additional object of the present invention is to provide a new and improved auxiliary support structure for the core vessel or barrel of a nuclear reactor wherein such structures facilitate the elimination of the need for the conventional, massive auxiliary support structures which required an inordinate amount of welding to be performed between such support structures and the reactor or pressure vessel sidewalls.

SUMMARY OF THE INVENTION

The foregoing and other objectives of the present invention are achieved through the provision of a plurality of auxiliary support structures equiangularly distributed about the inner periphery of the nuclear reactor or pressure vessel for laterally supporting or constraining the lower end of the reactor core vessel or barrel under normal operating conditions, and for accommodating vertical dynamic loads under external seismic or earthquake shock conditions, or similar dynamic loads under internal operational or mechanical malfunction conditions. The auxiliary support structures can further accommodate severe vertical load conditions through means of unique shock-absorption devices and capabilities.

Each of the auxiliary support structures comprises a crossbeam interconnecting together a pair of plate-type brackets integrally formed with the crossbeam and diverging therefrom. A substantially rectangular recess, open along the upper and front surfaces thereof, is defined within the forward portion of the crossbeam, and a pair of plastically collapsible, stainless steel cylinders are disposed within downwardly extending blind bores defined within the lower surface or floor of the recess for shock absorption purposes. The upper ends of the shock-absorbing cylinders project above the floor of the beam recess and are similarly disposed within blind bores defined within the lower end of a downwardly projecting stem portion of a substantially T-shaped key. The latter is fixedly secured to the undersurface of the core barrel bottom support plate with the lower end of the T-shaped key stem portion disposed within the crossbeam recess so that the core barrel or vessel is substantially laterally stabilized or confined in both radial and tangential directions.

Under normal operating conditions, all vertical loads of the core vessel or barrel are supported by means of the conventional flange-ledge system defined within the upper portion of the reactor or pressure vessel, and as a result, the core barrel or vessel, including its bottom support plate and the laterally extending crossbar portions of the T-shaped key secured thereto, does not normally rest upon, and therefore is not normally supported upon, the upper horizontal surfaces of the auxiliary support structures, but in fact is vertically spaced therefrom. The key stem portion is likewise disposed at an elevational level such that the upper walls of its blind bores are vertically spaced from the uppermost ends of the shock-absorbing cylinders. However, the vertical spacing defined between the shock-absorbing cylinders and the upper walls of the key stem bores is less than the vertical spacing defined between the upper horizontal surfaces of the auxiliary support structures, over which the core barrel bottom support plate and the lateral crossbar portions of the T-shaped key extend, and the undersurfaces of the lateral crossbar portions of the T-shaped key. In this manner, under severe vertical dynamic loading, wherein the core barrel or vessel may in fact vertically drop, the shock-absorbing cylinders will firstly absorb the vertical shock loads of the dropping core barrel, and subsequently, the core barrel will be supported upon the upper horizontal surfaces of the auxiliary core support structures. In supporting these static vertical loads of the core barrel, a unique feature of the present invention is the formulation of each plate-type bracket as having a substantially triangular configuration as opposed to being a simple cantilevered bracket having, for example, a rectangular configuration. As a result of this structural innovation, bending moments generated by means of the vertically acting loads have been substantially eliminated, and the vertically acting loads have been converted into shear and compression loads which are able to be safely accommodated by and within the brackets forming the auxiliary support structures of the present invention.

Another unique feature of the present invention has been the vertical or heightwise centralization of the auxiliary support structure load application location, particularly with respect to the application and accommodation of tangential loads when impressed upon the support structures. This load application location is substantially defined by the corresponding location of the support structure recess and its lateral stabilization interaction with the core barrel support plate T-shaped key. As a result of this disposition of the load application point or location, vertical moments normally impressed upon similar support structures by means of operating tangential forces have been eliminated. In addition, the divergent attitude of the plate-type brackets results in a conversion of such horizontally acting tangential forces into bending forces, as well as forces acting along the axes, or within the planes of, the plate-type brackets. Such latter forces are axial compression forces directed into the sidewalls of the reactor or pressure vessel whereby they can be accommodated in a safely distributed manner.

A last unique feature of the present invention resides in the fact that in view of the radial separation of the auxiliary support structure crossbeam from the interior wall surface of the reactor or pressure vessel as determined by means of the divergent plate-type brackets which are secured to the interior wall surface of the pressure vessel, unobstructed flow of the circulating coolant is facilitated past, around, and through the auxiliary support structures of the present invention. In addition, as debris will not tend to accumulate within the peripheral sidewall locations of the auxiliary support structures of the present invention, in light of the fact that gravitational and coolant flow forces will tend to wash such debris toward the bottom of the reactor vessel, operational clogging of the components of the auxiliary support structures is substantially eliminated or considerably reduced.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a vertical, cross-sectional view of the lower portion of a nuclear reactor pressure vessel within which the core barrel is supported by means of the auxiliary support structures of the present invention, only two of the four auxiliary support structures being shown;

FIG. 2 is a perspective view of one of the four auxiliary support structures of the present invention shown mounted upon a lower, sidewall portion of the pressure vessel of FIG. 1;

DESCRIPTION OF THE PREFERRED EMBODIMENT

Figure 3:
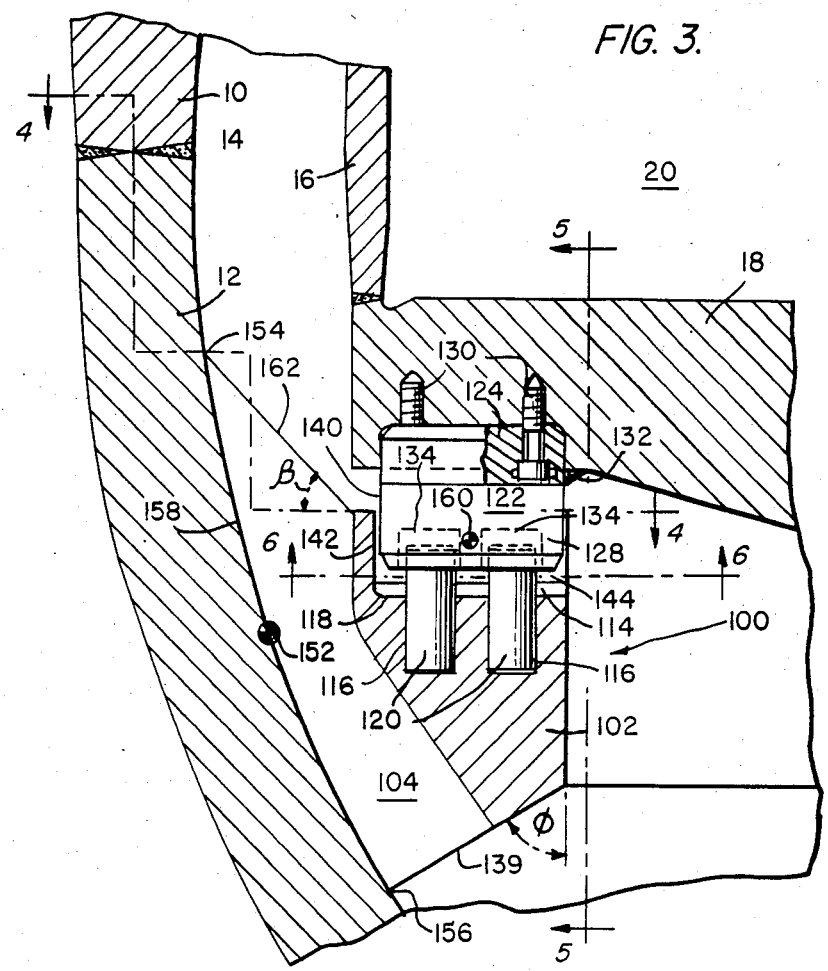
FIG. 3 is an enlarged cross-sectional view of that portion of FIG. 1 enclosed within the rectangularly configured, chain-like area located within the left side region of FIG. 1.

Referring now to the drawings, and more particularly to FIG. 1 thereof, there is disclosed, in part, a nuclear reactor pressure vessel which conventionally comprises a vertically oriented, cylindrically tubular shell portion 10 the bottom of which is closed by means of a hemispherical shell portion 12 welded to the upstanding cylindrical shell portion 10 along the mutually engaging peripheries of the shell sections 10 and 12 as noted at 14. A core vessel or barrel 16 is disposed internally within the reactor or pressure vessel 10, and is seen to include a bottom support plate 18 upon which are supported the various components of the reactor constituting the core internals, such as, for example, the fuel element assemblies, the fuel elememt assemblies support grid structure or framework, and the like, as generally denoted at 20, all in a conventional manner.

The upper end, not shown, or the core vessel or barrel 16 is conventionally provided with an annular, radially outwardly extending flange, and an upper region, also not shown, of the reactor pressure vessel 10 is correspondingly provided with an annular, radially inwardly projecting shoulder or ledge upon which the core barrel flange is seated. This structural system defined between the core vessel or barrel 16 and the reactor pressure vessel 10 constitutes the primary support means for suspendingly supporting the core vessel or barrel 16 within the reactor pressure vessel 10 in a downwardly extending, cantilevered manner. As has been noted hereinbefore, the lower end of the core vessel or barrel 16 must be laterally stabilized under the influence of a multitude of forces acting within a horizontal plane, and in addition, secondary support means should be provided for supporting the core vessel or barrel 16 relative to the reactor pressure vessel 10 under extraordinary vertical load conditions, such as, for example, those attendant earthquake shock loads or seismic vibrations, core barrel or weld fractures, coolant loop or other accidental or operational malfunctions, and the like.

In accordance then with the present invention, and with particular reference now being made to FIGS. 1–4 of the drawings, there is provided four auxiliary core vessels or barrel support structures, generally indicated by the reference character 100, which are mounted upon the upper sidewall portions of the lower hemispherical shell portion 12 of the reactor or pressure vessel 10. The auxiliary support structures 100 are equiangularly disposed about the inner peripheral surface of hemispherical shell portion 12, and it is noted that only two of the four auxiliary support structures 100 are shown in FIG. 1 engaging the periphery of plate 18.

Figure 4:
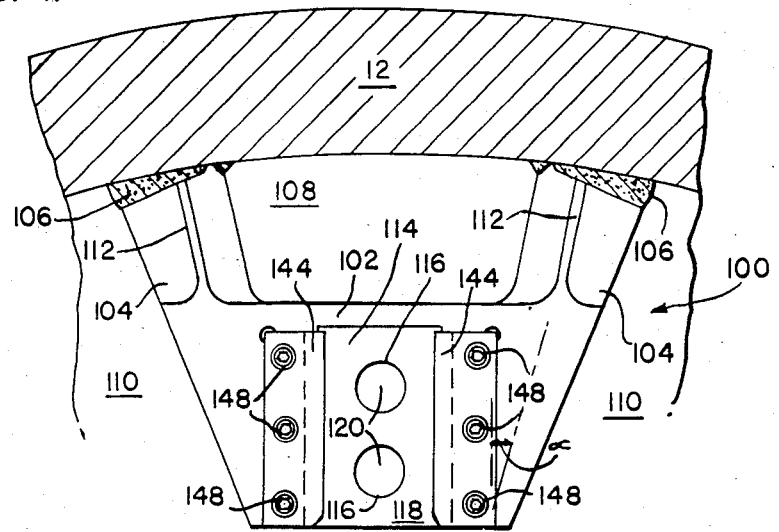
FIG. 4 is a plan view of the auxiliary support structure shown in FIG. 3, as mounted upon the pressure vessel and prior to the installation of the core barrel within the pressure vessel, taken along the line 4—4 of FIG. 3.
Figure 5:
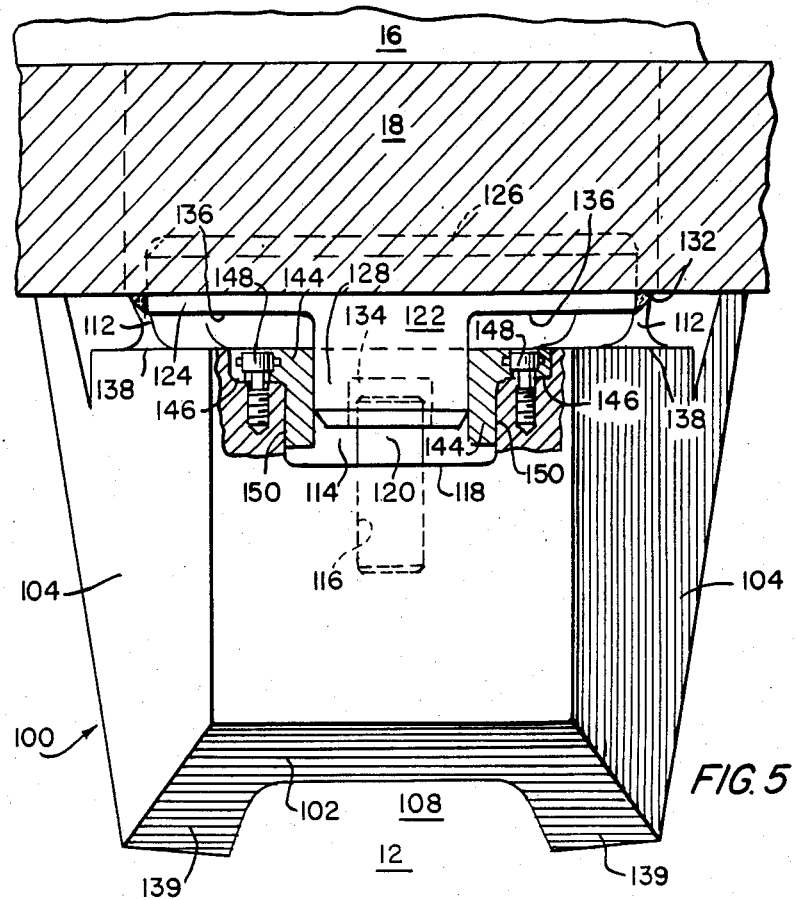
FIG. 5 is a front elevational view, partly in cross section, of the pressure vessel auxiliary support structure core barrel assemblage of FIG. 3 as taken along the line 5—5 of FIG. 3.

As may best be appreciated from FIGS. 2 and 4, each of the auxiliary support structures 100 comprises a horizontally disposed, tangentially oriented crossbeam member 102 and a pair of vertically disposed, plate-type brackets 104 integrally formed upon opposite sides or ends of the crossbeam member 102. Each of the brackets 104 is substantially radially oriented, and in this manner, the brackets 104 are relatively divergent with respect to each other as well as with respect to crossbeam member 102 as one proceeds in a radial direction from crossbeam member 102 to the reactor vessel shell portion 12. Each of the brackets 104 is also tapered as one proceeds in the radial direction, with the thicker or larger tapered dimension being disposed within the vicinity of the lower hemispherical shell portion 12 so as to enhance the lateral stability, and optimize the stress distribution, of the brackets 104, as well as the entire support structure 100, relative to shell wall portion 12 as will become more apparent hereinafter. The angle of divergence $\alpha$ of each bracket 104 is seen to be approximately 19°, and the distal or base end of each bracket 104 is welded to the shell wall portion 12 as at 106. The brackets 104 are also seen to extend radially outwardly of the crossbeam member 102 so as to dispose the crossbeam member 102 in a radially spaced manner with respect to the interior wall surface of shell portion 12. In this manner, a substantially vertical, rectangularly configured flow channel or conduit 108 is defined by means of hemispherical shell wall portion 12, brackets 104, and crossbeam member 102 through which coolant can flow in a substantially unimpeded pattern relative to the auxiliary support structures 100, it being of course also appreciated that coolant is likewise flowing in the regions exterior to, or laterally of, the structures 100 as designated at 110. In order to further facilitate such unimpeded, non-turbulent flow of coolant through and about the structures 100, each of the upper surfaces of brackets 104 is inclined downwardly, as viewed in the direction proceeding from the shell wall portion 12 to crossbeam member 102, through an angle $\beta$ of approximately 45° as best seen in FIG. 3, and in addition, these upper surfaces of brackets 104 may also be provided with rounded chamfered portions 112 for further promoting the aerodynamically laminar flow of the coolant relative to the support structures 100, as best seen in FIGS. 4 and 5.

Figure 6:
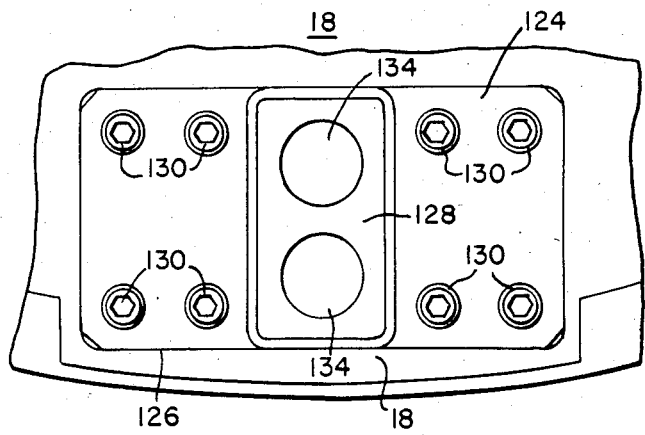
FIG. 6 is a bottom plan view of the bottom core barrel support plate and the T-shaped key mounted upon the bottom core barrel support plate, of the auxiliary support system of FIG. 3 as taken along the line 6—6 of FIG. 3 prior to the installation of the core barrel within the pressure vessel.

Crossbeam member 102 is provided with a rectangularly configured recess 114 which, as best seen from FIG. 2, is open along the front and top corresponding surfaces of crossbeam member 102. A pair of blind bores 116 are defined within the floor 118 of that portion of crossbeam member 102 which defines recess 114, and a pair of vertically oriented, plastically collapsible, cylindrical shock absorbers 120 are correspondingly disposed within bores 116. The height of the shock absorbers 120 is approximately twice the depth of the bores 116 such that the upper halves of shock absorbers 120 project above the floor 118 of crossbeam recess 114 as best seen in FIGS. 1, 3, and 5. A substantially T-shaped key 122, as best seen in FIG. 5, has its upper crosspiece 124 disposed within a rectangularly configured, upwardly extending recess 126 defined within the core barrel bottom support plate 18, while the downwardly depending stem portion 128 of key 122 is disposed within crossbeam recess 114. Key 122 is secured within core barrel bottom support plate 18 by means of bolt fasteners 130 as best seen in FIGS. 3 and 6, and in addition, a peripheral weld is defined between the key 122 and plate 18 as indicated at 132 in FIGS. 3 and 5. Key stem 128 is provided with a pair of upwardly extending blind bores 134 for accommodating the upper portions of the shock absorbers 120, and it is noted, with particular reference being made to FIGS. 3 and 5, that under normal operating conditions wherein the core barrel or vessel 16 is conventionally vertically supported upon the reactor or pressure vessel 10 by means of the aforenoted upper core barrel flange and pressure vessel ledge system, not shown, the uppermost ends of bores 134 are vertically spaced above the upper ends of shock absorbers 120. In a similar manner, and also under such normally operating conditions of the reactor facility, the undersurface 136 of key crosspiece 124 is vertically spaced above the upper horizontal surface 138 of the structure 100 within the vicinity of the juncture of the crossbeam 102 and the brackets 104, as best seen in FIG. 5. It is to be noted that the vertical spacing defined between the upper ends of shock absorbers 120 and the ceilings of key stem bores 134 is less than the vertical spacing defined between the undersurfaces 136 of key crosspiece and the upper surfaces 138 of the structure 100. In this manner, should the reactor facility experience severe vertical loading wherein, for example, the core barrel 16 undergoes a vertical movement relative to the pressure vessel 10, vertical interaction or engagement between the shock absorbers 120 and the ceilings of key stem bores 134 will initially cause plastic collapsing of the shock absorbers 120 whereby the latter perform their shock absorption function. Subsequently, of course, the core barrel 16 will come to rest, and be supported upon, the upper surfaces 138 of the structures 100, and in addition, the bottom of key stem 128 will similarly come to rest, and be supported upon floor 118 of crossbeam recess 114 in view of substantially similar vertical spacing defined between floor 118 and stem 128, and between key crosspiece 124 and structure surfaces 138.

In connection with the accommodation of the aforenoted severe vertical loading, it is to be further appreciated that an additonally critically unique feature of the present invention resides in the formation of the structure brackets 104 in such a manner that the bottom portions thereof are inclined downwardly as one proceeds radially outwardly toward the hemispherical shell wall 12. These inclined bottom portions 139 are denoted in FIG. 3 as forming an angle $\phi$ of approximately 60°. Stress analysis of brackets under vertical load conditions have revealed, for example, that in the instance of conventional cantilevered brackets, wherein, for example, bottom portions 139 of the brackets 104 would be disposed horizontally, or in other words, $\phi$ would be equal to 90°, the vertically impressed loads would generate bending stresses or moments within the brackets-reactor shell wall assemblage. Such an assemblage conventionally requires the cantilevered brackets to be massive and to require extensive weldments to be defined between the brackets and the reactor vessel wall. Still further, such bending moments tend to deleteriously affect the weldments from a fatigue point of view, thereby jeopardizing further the service integrity of the reactor facility under such operational conditions. In accordance with the present invention, the aforenoted bending moments are converted into shear and compression forces acting along the interior surface of shell wall 12 and parallel to bottom surfaces 139, respectively.

As may best be appreciated from FIGS. 1 and 3, the rear surface wall 140 of key stem 122 is spaced just slightly radially inwardly, or away from, the rear wall surface 142 of crossbeam 102 which defines recess 114, and in this manner, the core vessel or barrel 16 is laterally stabilized within a horizontal plane relative to pressure vessel 10 under radially directed load forces. With additional reference being made to FIG. 4, it can be seen that when radial load forces are applied to the support structures under either normal or abnormal operating conditions, the provision of the divergent brackets 104 enables the radial load forces to be transmitted in radial directions along each bracket's radial axis or plane, and since the brackets 104 are divergent, the transmitted forces are distributed to the reactor vessel shell wall 12 in a substantially balanced manner, or in other words, oppositely directed force components, which tend to balance each other, are transmitted to the shell wall 12.

In order to provide a similarly stabilized state for the core barrel 16 relative to pressure vessel 10 under tangentially directed load forces, shims 144, having a substantially inverted L-shaped configuration, are secured to radially extending shoulder portions 146 of crossbeam member 102 by means of a plurality of bolt fasteners 148 as best seen in FIGS. 4 and 5, the dependent legs of shims 144 extending along the interior sidewalls 150 which define crossbeam recess 114. The corresponding sidewalls of key stem 122 are interposed between the shims 144 thereby achieving the desired lateral stabilization. When tangential loads are thus impressed upon the support structures 100 during normal or abnormal operating conditions, the divergency of the brackets 104, as determined by the angle $\alpha$ is again seen to comprise a crtically important feature of the present invention for reasons similar to those noted hereinbefore in connection with the disposition of bracket bottom portions 139 as defined by the angle $\phi$. In particular, if the angle $\alpha$ were 0°, only bending moments would be generated within the brackets 104 relative to shell wall 12, and in effect, the brackets would be simple cantilevered structures with stress fatigue problems similar to those previously discussed in connection with conventional vertical cantilevered brackets, that is, with respect to vertical loading. In accordance with the present invention, however, as a result of the provision of the divergent brackets 104, as determined by the angle $\alpha$, tangentially directed load forces, and the bending moments generated thereby, are converted into a composite of bending moments, shear forces, and radial compression forces acting along the axes or planes of the brackets 104. Such stress and moment distribution patterns can be effectively accommodated through means of the support structures 100 and the hemispherical shell wall 12 in a substantially improved manner than would normally be possible with simple cantilevered bracket structures.

Continuing still further, it is well known in connection with stress analysis techniques that with respect to brackets mounted upon a base wall, such as, for example, the brackets 104 mounted upon shell wall 12, the effective center of gravity will be located at a point upon the junction or boundary of the bracket and the base wall which is at the midway point of the junction or boundary line length or distance. In particular, the center of gravity of each bracket 104 is shown in FIG. 3 as being at 152 which is located midway between the opposite ends 154 and 156 of each bracket 104 defining the length or distance of the junction line or boundary 158 defined between brackets 104 and shell wall 12. It is to be appreciated that tangential loads will be transmitted between the key stem 128 and the support structure 100 at a point located centrally of the common height or depth distance defined between the key stem 128 and the shims 144, such being illustrated at 160 in FIG. 3. If a moment arm, therefore, exists between the center of load 160 and the center of gravity 152, vertical bending moments will be induced within the brackets 104 of the support structures 100 under the influence of the aforenoted tangentially directed forces. It is further well known that the moment arm is determined by the distance defined between a plane passing through the center of gravity 152 and extending perpendicular to shell wall 12, and another plane, parallel to the first plane, passing through the center of load 160. Consequently, if this distance can be eliminated, the moment arm is then eliminated and the vertical bending or twisting moments are correspondingly eliminated. This is precisely what has been achieved by means of the present invention, and such has been achieved by means of, in effect, centralizing the center of load 160 with respect to the brackets 104 such that both the center of load 160 and the center of gravity 152 will both be disposed within the aforenoted plane passing through the center of gravity 152 and extending perpendicular to shell wall 12. In particular, this result has been achieved through the provision of the upper inclined portions 162 of brackets 104 as determined by the angle of inclination $\beta$. If the angle $\beta$ were 0°, then the upper inclined portions 162 of brackets 104 would be eliminated and the length of junction line or boundary 158 defined between brackets 104 and shell wall 12 would be correspondingly shortened. The center of gravity 152 would then be correspondingly moved downwardly through a proportional distance toward the lower end 156 of bracket 104, and therefore, a moment arm would be created between the center of gravity 152 and the center of load 160. Consequently, it is seen that the provision of the upper inclined surfaces 162 of brackets 104 serves the additionally important function of eliminating the vertical bending or twisting moments which would normally be generated by means of the tangentially directed load forces developed between the core barrel 16 and the reactor vessel 10 as determined by the interaction developed between the key 122 and the support structure 100. The tangential load forces may then be adequately accommodated by means of the structural brackets 104 and the shell wall 12 in the manner noted hereinabove.

Obviously, many modifications and variations of the present invention are possible in light of the above teachings. It is therefore to be understood that within the scope of the appended claims, the present invention may be practiced otherwise than as specifically described herein.

We claim:

1. A nuclear reactor, comprising:
   a reactor pressure vessel, having a vertically oriented cylindrical tubular shell portion, the bottom of which is closed by a hemispherical shell portion having upper sidewalls;
   a core barrel disposed internally within said reactor pressure vessel;
   means mounted upon said reactor pressure vessel for engaging the periphery of said core barrel, comprising a cross beam member, and a pair of brackets connected to the opposite ends of said crossbeam member, said pair of brackets extending radially outwardly of said crossbeam member and engaging said reactor pressure vessel at the upper sidewalls of said hemispherical shell portion so as to radially space said crossbeam member from said reactor pressure vessel; recess means defined within said crossbeam member of said engaging means; key means secured to said core barrel and disposed within said recess means and
   vertically oriented channel means defined within the confines of said crossbeam member and said brackets of said engaging means for providing a vertically directed fluid conduit for coolant flow through said engaging means.

2. A nuclear reactor as set forth in claim 1, further comprising:
   means for transmitting radial load forces from said core barrel to said reactor pressure vessel as radially directed compression load forces, comprising said pair of brackets in the form of radially oriented and relatively divergent brackets, and
   whereby said radially directed compression load forces include oppositely directed, balanced force components.

3. A nuclear reactor as set forth in claim 1, wherein: said core barrel comprises a bottom support plate; and
   said engaging means engage the outer periphery of said bottom support plate.

4. A nuclear reactor as set forth in claim 1, further comprising:
   shock absorber means disposed within said recess means and interposed between said engaging means and said key means.

5. A nuclear reactor as set forth in claim 1, further comprising:
   means defined upon the brackets of said engaging means for converting horizontal bending moments into circumferential shear and radial compression forces under horizontally disposed tangentially oriented force loads, wherein said brackets are radially oriented and relatively divergent.

6. A nuclear reactor as set forth in claim 1 wherein four said engaging means are provided, equiangularly disposed about the inner periphery of said pressure vessel.

7. A nuclear reactor as set forth in claim 1, further comprising:
   shock absorbing means mounted upon said crossbeam member of said engaging means.

8. A nuclear reactor as set forth in claim 7, wherein:
   said shock absorbing means comprises vertically disposed plastically collapsible stainless steel cylinders.

9. A nuclear reactor as set forth in claim 1, further comprising:
   means defined upon the brackets of said engaging means for eliminating vertical bending moments under horizontally disposed tangentially directed force loading.

10. A nuclear reactor as set forth in claim 9, wherein said eliminating means comprises:
    means defining the center of gravity of said engaging means relative to said reactor pressure vessel within a plane extending perpendicular to said reactor pressure vessel and including the center of load of said engaging means under said horizontally disposed tangentially directed force loading conditions.

11. A nuclear reactor as set forth in claim 1, further comprising:
    means defined upon the brackets of said engaging means for converting vertical bending moments into circumferential shear and radial compression forces under vertical force loading.

12. A nuclear reactor as set forth in claim 11, wherein said converting means comprises:
    lower support surfaces on said brackets inclined with respect to both horizontal and vertical planes within said reactor vessel.

13. A nuclear reactor as set forth in claim 12, wherein:
    said lower support surfaces are inclined at an angle $\phi$ of 60° with respect to said vertical plane.

* * * * *